United States Patent
Ohshita et al.

(10) Patent No.: US 6,355,379 B1
(45) Date of Patent: Mar. 12, 2002

(54) POLYMER ELECTROLYTE BATTERIES HAVING IMPROVED ELECTRODE/ELECTROLYTE INTERFACE

(75) Inventors: Ryuji Ohshita, Neyagawa; Maruo Kamino, Katano; Toshiyuki Nohma; Koji Nishio, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/495,327

(22) Filed: Feb. 1, 2000

(30) Foreign Application Priority Data

Feb. 3, 1999 (JP) .......................................... 11-026000

(51) Int. Cl.⁷ ............................................... H01M 6/18
(52) U.S. Cl. .................... 429/304; 429/188; 429/321; 429/325
(58) Field of Search ................ 429/188, 321, 429/325, 304

(56) References Cited

U.S. PATENT DOCUMENTS

| | | | |
|---|---|---|---|
| 5,019,469 A | 5/1991 | Muller | |
| 5,232,795 A | 8/1993 | Simon et al. | |
| 5,695,873 A | 12/1997 | Kumar et al. | |
| 5,997,836 A | * 12/1999 | Sato et al. | 423/420.2 |
| 6,194,098 B1 | * 2/2001 | Ying et al. | 429/129 |
| 6,214,061 B1 | * 4/2001 | Visco et al. | 29/623.5 |

FOREIGN PATENT DOCUMENTS

| | | |
|---|---|---|
| JP | 5-144315 | 6/1993 |
| JP | 9-97617 | 4/1997 |
| JP | 11-31510 | 2/1999 |

OTHER PUBLICATIONS

Electrochimica Acta, vol. 43, Nos. 10–11, pp. 1333–1337, 1998.
Solid State Ionics 118 (1999) pp. 149–157.

* cited by examiner

Primary Examiner—Carol Chaney
Assistant Examiner—Dah-Wei D. Yuan
(74) Attorney, Agent, or Firm—Armstrong, Westerman, & Hattori, LLP

(57) ABSTRACT

In an inventive polymer electrolyte battery including a positive electrode, a negative electrode and a polymer electrolyte, at least one of the positive electrode and the negative electrode is formed with an inorganic amorphous solid electrolyte film at its interface with the polymer electrolyte.

12 Claims, 2 Drawing Sheets

POLYMER ELECTROLYTE BATTERIES HAVING IMPROVED ELECTRODE/ ELECTROLYTE INTERFACE

BACKGROUND OF THE INVENTION

1. Field of the Invention

The present invention relates to a polymer electrolyte battery including a positive electrode, a negative electrode and a polymer electrolyte. More particularly, the invention relates to a polymer electrolyte battery with better charge/ discharge cycle characteristics attained through improvement in the characteristics of a positive electrode/polymer electrolyte interface and a negative electrode/polymer electrolyte interface.

2. Description of the Related Art

Recently, a non-aqueous electrolyte battery of high electromotive force based on the oxidation/reduction of lithium in the non-aqueous electrolyte solution has been used as one of novel batteries featuring high power and high energy density.

Unfortunately, such a non-aqueous electrolyte battery suffers leakage of the non-aqueous electrolyte solution or degradation of the battery characteristics resulting from reaction between the non-aqueous electrolyte solution and the positive or negative electrode. In this connection, the polymer electrolyte batteries employing the polymer electrolyte have received current attention.

The prior-art polymer electrolyte batteries generally employ a polymer electrolyte composition which comprises a polymer, such as polyethylene oxide and polyvinylidene fluoride, containing a solute of lithium salt, such as $LiPF_6$, or a polymer electrolyte composition which comprises a polymer impregnated with a non-aqueous electrolyte solution containing an organic solvent, such as carbonate, dissolving the above solute therein.

Unfortunately, however, the aforesaid polymer electrolyte batteries suffer such a poor adhesion between the positive or negative electrode and the polymer electrolyte that resistance is increased at the positive electrode/polymer electrolyte interface or the negative electrode/polymer electrolyte interface. This detrimentally degrades the charge/discharge cycle characteristics of the polymer electrolyte batteries.

In a recent attempt to improve the polymer electrolyte battery in the charge/discharge cycle characteristics, a surfactant is added to the polymer electrolyte for reducing the resistance at the interface between the polymer electrolyte and the positive or negative electrode.

However, the addition of the surfactant to the polymer electrolyte involves a fear that the surfactant may form impurities responsible for the deterioration of a positive- or negative-electrode active material, thus conversely lowering the charge/discharge cycle characteristics of the polymer electrolyte battery.

SUMMARY OF THE INVENTION

A first object of the invention is to enhance the adhesion between the positive or negative electrode and the polymer electrolyte of the polymer electrolyte battery including the positive electrode, negative electrode and polymer electrolyte, thereby to reduce the resistance at the interface between the positive or negative electrode and the polymer electrolyte.

A second object of the invention is to enhance the ionic conductivity at the interface between the positive or negative electrode and the polymer electrolyte.

A third object of the invention is to improve the charge/ discharge cycle characteristics of the polymer electrolyte battery.

In the polymer electrolyte battery including the positive electrode, negative electrode and polymer electrolyte in accordance with the invention, at least one of the positive electrode and the negative electrode is formed with an inorganic amorphous solid electrolyte film at its interface with the polymer electrolyte. The amorphous structure is defined herein to be a non-crystalline state resulting from the loss of crystalline lattice and may be produced by deposition or sputtering.

As suggested by the polymer electrolyte battery of the invention, if the positive or negative electrode is formed with the inorganic amorphous solid electrolyte film at its interface with the polymer electrolyte, the adhesion between the polymer electrolyte and the positive or negative electrode is increased by this inorganic solid electrolyte film. In addition, the inorganic solid electrolyte film itself has the ionic conductivity. Hence, the resistance at the interface between the polymer electrolyte and the positive or negative electrode is decreased. As a result, the interface between the polymer electrolyte and the positive or negative electrode is improved in the ionic conductivity so that uniform cell reactions take place in repeated charge/discharge processes, leading to the improved charge/discharge cycle characteristics of the polymer electrolyte battery.

As an inorganic solid electrolyte for forming the aforesaid inorganic amorphous solid electrolyte film, there may be used at least one material selected from the group consisting of, for example, $Li_3N$, $LiTi_2(PO_4)_3$, $Li\text{-}\beta Al_2O_3$, $LiI$, $LiI\text{—}Li_2S\text{—}P_2O_5$, $LiI\text{—}Li_2S\text{—}B_2S_3$, $LiI\text{—}Li_3N\text{—}LiOH$, $Li_2O\text{—}B_2O_3$, $Li_2O\text{—}V_2O_3\text{—}SiO_2$, $LiTaO_3$ and the like.

If the inorganic solid electrolyte film on the positive or negative electrode has an excessive thickness, the inorganic solid electrolyte film has such a great resistance as to lower the ionic conductivity at the interface between the positive or negative electrode and the polymer electrolyte. For this reason, the inorganic solid electrolyte film preferably has a thickness of 10 μm or less.

The inventive polymer electrolyte battery is characterized in that at least one of the positive electrode and the negative electrode is formed with the aforesaid inorganic amorphous solid electrolyte film at its interface with the polymer electrolyte and does not particularly limit the materials for forming the positive electrode, negative electrode and polymer electrolyte. The inventive polymer electrolyte battery may employ any known materials generally used in the art.

As the aforesaid polymer electrolyte, there may be used a solid-state polymer electrolyte comprised of a polymer containing a solute, or a gelated polymer electrolyte comprised of a polymer impregnated with a non-aqueous electrolyte solution containing a solvent dissolving a solute therein.

Any of the know materials generally used in the art may be employed as the aforesaid polymer. Examples of a suitable polymer include those having a molecular weight of 5000 to 500000 such as polyethylene glycol methacrylate, polyethylene oxide, polyethylene-imine, polyvinylidene fluoride, polyacrylonitrile and the like. In particular, the use of such a polymer as a polyethylene oxide and a polyethylene-imine results in an even greater improvement of the charge/discharge cycle characteristics of the polymer electrolyte battery. A conceivable reason for this is because the polymer comprised of a polyethylene oxide or a polyethylene-imine contributes to an even greater adhesion between the polymer electrolyte and the inorganic solid electrolyte film, thereby further reducting the resistance at the interface between the positive or negative electrode and the polymer electrolyte.

Any of the known solutes generally used in the art may be used as the above solute. Examples of a suitable solute include lithium compounds such as $LiPF_6$, $LiBF_4$, $LiN(C_2F_5SO_2)_2$, $LiAsF_6$, $LiSbF_6$, $LiAlF_4$, $LiGaF_4$, $LiInF_4$, $LiClO_4$, $LiN(CF_3SO_2)_2$, $LiCF_3SO_3$, $LiSiF_6$, $LiN(CF_3SO_2)(C_4F_9SO_2)$ and the like.

Any of the known solvents generally used in the art may be used for dissolving the aforesaid solute in the preparation of the gelated polymer electrolyte comprising the aforesaid polymer impregnated with the non-aqueous electrolyte solution. Examples of a suitable solvent include ethylene carbonate, propylene carbonate, butylene carbonate, dimethyl carbonate, diethyl carbonate, methylethyl carbonate, 1,2-diethoxyethane, 1,2-dimethoxyethane, ethoxymethoxyethane and the like.

Any of the known positive-electrode materials generally employed in the art may be used for forming the positive electrode of the inventive polymer electrolyte battery. Examples of a suitable material include lithium-containing transition metal oxides such as lithium-containing manganese oxides, lithium-containing cobalt oxides, lithium-containing vanadium oxides, lithium-containing nickel oxides, lithium-containing iron oxides, lithium-containing chromium oxides, lithium-containing titanium oxides and the like.

Any of the known negative-electrode materials generally employed in the art may be used for forming the aforesaid negative electrode. Examples of a suitable material include a lithium metal; lithium alloys such as Li—Al, Li—In, Li—Sn, Li—Pb, Li—Bi, Li—Ga, Li—Sr, Li—Si, Li—Zn, Li—Cd, Li—Ca and Li—Ba; carbon materials capable of absorbing/desorbing lithium ions such as graphites, cokes and sintered organic substances; and metal oxides having lower potentials than the positive-electrode material, such as $Li_4Ti_5O_{12}$, $TiO_2$, $Nb_2O_5$, $Fe_2O_3$, $MoO_2$, $MoO_3$, $WO_2$, $WO_3$, $SnO_2$, $SnO$, $SiO_2$ and $SiO$. Particularly, the use of the carbon material as the negative-electrode material results in an even greater improvement of the charge/discharge cycle characteristics of the polymer electrolyte battery. A conceivable reason for this is because if the aforesaid inorganic amorphous solid electrolyte film is formed on the negative electrode including the carbon material with a great surface area, this inorganic solid electrolyte film provides a greater surface on which the negative electrode adheres to the polymer electrolyte, thereby further increasing the ionic conductivity at the interface between the negative electrode and the polymer electrolyte.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Now, the polymer electrolyte battery according to the invention will be described in detail by way of specific examples thereof while comparative examples will be cited to demonstrate that the examples of the inventive polymer electrolyte battery accomplish the improved charge/discharge cycle characteristics. It is to be noted that the polymer electrolyte battery of the invention should not be limited to the following examples thereof and suitable modifications may be made thereto within the scope of the invention.

Example 1

Figure 1:
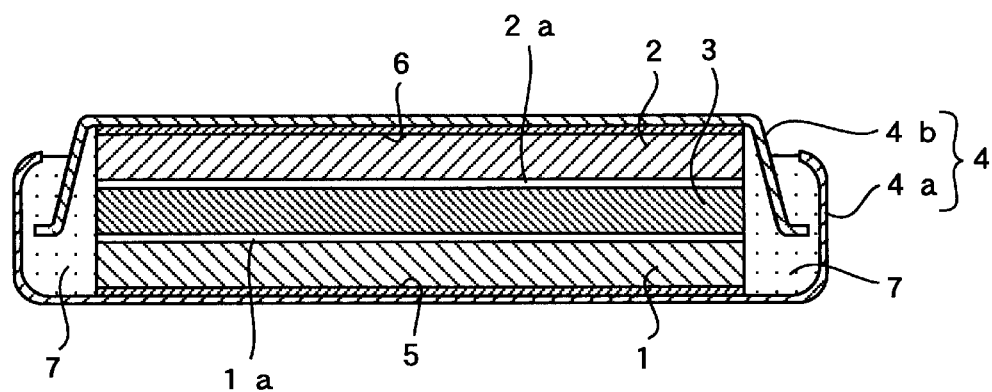
FIG. 1 is a sectional view for illustrating an internal construction of a polymer electrolyte battery according to the invention wherein an inorganic amorphous solid electrolyte film is interposed between a positive electrode and a polymer electrolyte and between a negative electrode and the polymer electrolyte, respectively.

In Example 1, a flat-type polymer electrolyte battery was fabricated as shown in FIG. 1 using a positive electrode, a negative electrode and a polymer electrolyte which were prepared as follows.

Preparation of Positive Electrode

A positive electrode was prepared as follows: Powdery lithium-containing cobalt dioxide $LiCoO_2$ as the positive-electrode material, powdery carbon as an electronic conductor, and polyvinylidene fluoride as a binder were mixed together in a weight ratio of 85:10:5. The resultant mixture was added with N-methyl-2-pyrrolidone to form a slurry, which was coated on a positive-electrode current collector of an aluminum foil by means of a doctor blade. Subsequently, the slurry was compressed and heat-treated at 130° C., thus giving the disk-like positive electrode having a thickness of about 80 μm and a diameter of 10 mm.

Subsequently, the positive electrode thus formed on the positive-electrode current collector was subjected to a fifty-minute sputtering process using $LiTi_2(PO_4)_3$ as a target under sputtering conditions listed in Table 1 as below. Thus, an inorganic amorphous solid electrolyte film of $LiTi_2(PO_4)_3$ was formed in a thickness of about 1 μm on a surface of the positive electrode opposite from the positive-electrode current collector. The resultant inorganic solid electrolyte film presented the amorphous structure due to the loss of the crystal lattice.

TABLE 1

| back pressure (Torr) | Ar gas pressure (Torr) | RF power (W) | film formation speed (Å/min) |
|---|---|---|---|
| $2 \times 10^{-7}$ | $1.5 \times 10^{-2}$ | 100 | 200 |

Preparation of Negative Electrode

A negative electrode was prepared as follows: Powdery graphite having a mean particle size of 10 μm, as the negative-electrode material, and polyvinylidene fluoride as the binder were mixed together in a weight ratio of 95:5. The resultant mixture was added with N-methyl-2-pyrrolidone to form a slurry, which was coated on a negative-electrode current collector of a copper foil by means of the doctor blade. Subsequently, the slurry was compressed and heat-treated at 130° C., thus giving the disk-like negative electrode having a thickness of about 70 $\mu$m and a diameter of 10 mm.

Subsequently, the negative electrode thus formed on the negative-electrode current collector was subjected to the same sputtering process as in the processing of the positive electrode. Thus, the inorganic amorphous solid electrolyte film of $LiTi_2(PO_4)_3$ was formed in a thickness of about 1 $\mu$m on a surface of the negative electrode opposite from the negative-electrode current collector.

Preparation of Polymer Electrolyte

A polymer electrolyte was prepared as follows: A solution mixture was prepared which contained polyethylene glycol methacrylate having a number average molecular weight (Mn) of 360 (commercially available from Aldrich Chemical Co.,Inc.) and lithium perchlorate $LiClO_4$ in a weight ratio of 94:6. The resultant solution mixture was coated in a thickness of 25 $\mu$m on the inorganic amorphous solid electrolyte film thus formed on the positive electrode. Subsequently, the polyethylene glycol methacrylate was polymerized by exposure to the electron beams using an electroncurtain electron beam irradiation equipment (Output: 200 kV, Dose: 2 Mrad). Thus, the polymer electrolyte of polyethylene glycol methacrylate was laid on the inorganic amorphous solid electrolyte film over the positive electrode.

Fabrication of Battery

A battery was fabricated as follows: As shown in FIG. 1, the negative electrode 2 was stacked on the positive electrode 1 with the polymer electrolyte 3 laid over its inorganic amorphous solid electrolyte film 1a in a manner that the inorganic amorphous solid electrolyte film 2a of the negative electrode 2 was in contact with the polymer electrolyte 3. Thus, the inorganic amorphous solid electrolyte films 1a, 2a were interposed between the positive electrode 1 and the polymer electrolyte 3 and between the negative electrode 2 and the polymer electrolyte 3, respectively. The resultant stack was placed in a battery case 4 consisting of a positive electrode can 4a and a negative electrode can 4b. The positive electrode 1 was connected with the positive electrode can 4a via the positive-electrode current collector 5 while the negative electrode 2 was connected with the negative electrode can 4b via the negative-electrode current collector 6. The positive electrode can 4a was electrically isolated from the negative electrode can 4b by means of an insulation packing 7. Thus was fabricated the flat-type polymer electrolyte battery.

Example 2

Figure 2:
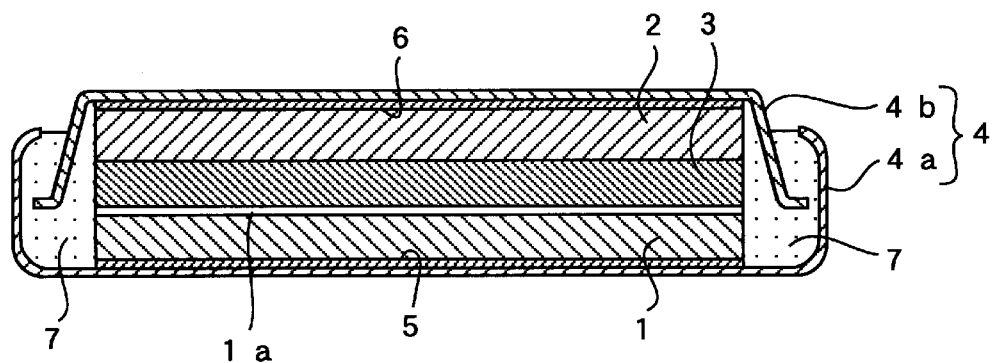
FIG. 2 is a sectional view for illustrating an internal construction of a polymer electrolyte battery according to the invention wherein the inorganic amorphous solid electrolyte film is interposed only between the positive electrode and the polymer electrolyte.

In Example 2, a flat-type polymer electrolyte battery was fabricated the same way as in Example 1 except that the negative electrode was free of the inorganic amorphous solid electrolyte film of $LiTi_2(PO_4)_3$, which was placed at the interface between the negative electrode and the polymer electrolyte in Example 1. As shown in FIG. 2, the inorganic amorphous solid electrolyte film 1a of $LiTi_2(PO_4)_3$ was interposed only between the positive electrode 1 and the polymer electrolyte 3.

Example 3

Figure 3:
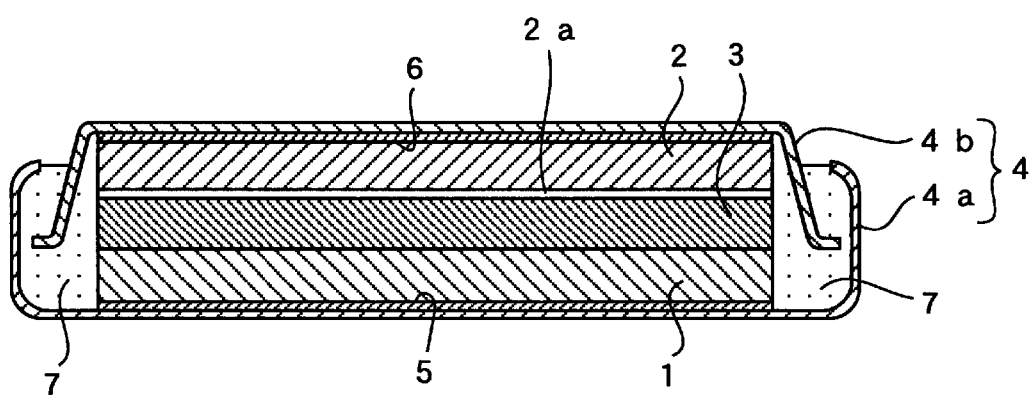
FIG. 3 is a sectional view for illustrating an internal construction of a polymer electrolyte battery according to the invention wherein the inorganic amorphous solid electrolyte film is interposed only between the negative electrode and the polymer electrolyte.

In Example 3, a flat-type polymer electrolyte battery was fabricated the same way as in Example 1 except that the positive electrode was free of the inorganic amorphous solid electrolyte film of $LiTi_2(PO_4)_3$, which was placed at the interface between the positive electrode and the polymer electrolyte in Example 1. As shown in FIG. 3, the inorganic amorphous solid electrolyte film 2a of $LiTi_2(PO_4)_3$ was interposed only between the negative electrode 2 and the polymer electrolyte 3.

Comparative Example 1

Figure 4:
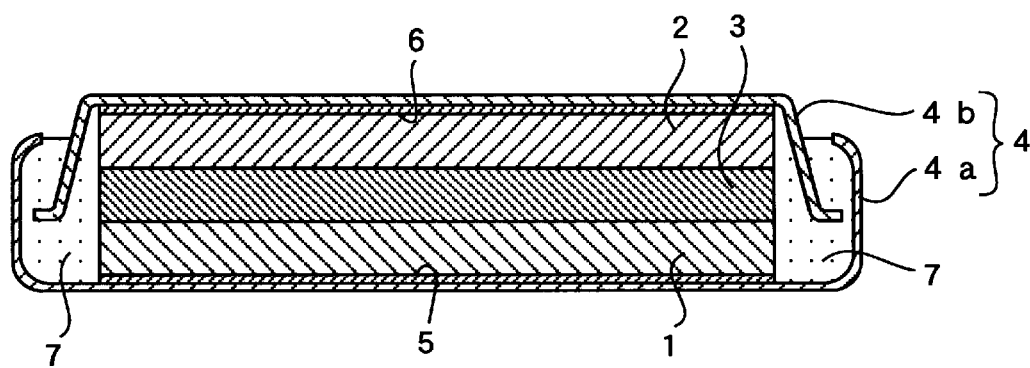
FIG. 4 is a sectional view for illustrating an internal construction of a polymer electrolyte battery according to a comparative example wherein no inorganic amorphous solid electrolyte film is interposed between the positive electrode and the polymer electrolyte or between the negative electrode and the polymer electrolyte.

In Comparative Example 1, a flat-type polymer electrolyte battery was fabricated the same way as in Example 1 except that both the positive and negative electrodes were free of the inorganic amorphous solid electrolyte film of $LiTi_2(PO_4)_3$, which was disposed at the respective interfaces between the positive electrode and the polymer electrolyte and between the negative electrode and the polymer electrolyte in Example 1. As shown in FIG. 4, the positive electrode 1 and the negative electrode 2 were in direct contact with the polymer electrolyte 3.

Next, the polymer electrolyte batteries of Examples 1 to 3 and Comparative Example 1 were each cycled through 100 charge/discharge cycles at 25° C., where each cycle consisted of charging at 600 $\mu$A charge current to a cutoff voltage of 4.2 V followed by discharging at 600 $\mu$A discharge current to a cutoff voltage of 2.75 V. Each polymer electrolyte battery was determined for the discharge capacities at cycle 1 and cycle 100. The results are listed in Table 2 as below.

TABLE 2

| | discharge capacity (mAh) | |
|---|---|---|
| | at cycle 1 | at cycle 100 |
| example 1 | 3.2 | 3.0 |
| example 2 | 3.1 | 2.8 |
| example 3 | 3.1 | 2.8 |
| comparative example 1 | 2.8 | 1.4 |

As apparent from the results, the polymer electrolyte batteries of Examples 1 to 3, wherein at least one of the positive electrode and the negative electrode is formed with the inorganic amorphous solid electrolyte film of $LiTi_2(PO_4)_3$ at its interface with the polymer electrolyte, have achieved a notable improvement in the charge/discharge cycle characteristics with smaller discharge capacity drops at cycle 100 than the battery of Comparative Example 1 wherein the positive electrode and the negative electrode are free of the inorganic amorphous solid electrolyte film and in direct contact with the polymer electrolyte.

Examples 4 to 6

In Examples 4 to 6, a different material from that employed by Examples 1 to 3 was used for forming the inorganic amorphous solid electrolyte film at the interface between the polymer electrolyte and the positive or negative electrode. An inorganic amorphous solid electrolyte film was laid on the positive or negative electrode by sputtering using $Li_3N$ as the target under the same conditions as in Example 1.

In Example 4, an inorganic amorphous solid electrolyte film of $Li_3N$ was formed at the respective interfaces between the positive electrode and the polymer electrolyte and between the negative electrode and the polymer electrolyte in the aforementioned manner. Except for this, the same procedure as in Example 1 was taken to fabricate a flat-type polymer electrolyte battery wherein the inorganic amorphous solid electrolyte films 1a, 2a were interposed between the positive electrode 1 and the polymer electrolyte 3 and between the negative electrode 2 and the polymer electrode 2, respectively.

In Example 5, the inorganic amorphous solid electrolyte film of $Li_3N$ was formed only at the interface between the positive electrode and the polymer electrolyte. A flat-type polymer electrolyte battery was fabricated in a similar manner to Example 2 wherein the inorganic amorphous solid electrolyte film 1a was interposed only between the positive electrode 1 and the polymer electrolyte 3, as shown in FIG. 2.

In Example 6, the inorganic amorphous solid electrolyte film of $Li_3N$ was formed only at the interface between the negative electrode and the polymer electrolyte. A flat-type polymer electrolyte battery was fabricated in a similar manner to Example 3 wherein the inorganic amorphous solid electrolyte film 2a was interposed only between the negative electrode 2 and the polymer electrolyte 3, as shown in FIG. 3.

Similarly to Examples 1 to 3, the polymer electrolyte batteries of Examples 4 to 6 were each determined for the discharge capacities at cycle 1 and cycle 100. The results are listed in Table 3 as below.

TABLE 3

|  | discharge capacity (mAh) | |
| --- | --- | --- |
|  | at cycle 1 | at cycle 100 |
| example 4 | 3.3 | 3.0 |
| example 5 | 3.2 | 2.9 |
| example 6 | 3.1 | 2.8 |

As apparent from the results, the polymer electrolyte batteries of Examples 4 to 6, wherein at least one of the positive electrode and the negative electrode is formed with the inorganic amorphous solid electrolyte film of $Li_3N$ at its interface with the polymer electrolyte, have achieved a notable improvement in the charge/discharge cycle characteristics with a smaller discharge capacity drop at cycle 100 than the battery of Comparative Example 1 wherein the positive electrode and the negative electrode are free of the inorganic amorphous solid electrolyte film and in direct contact with the polymer electrolyte.

Examples 7 to 9

In Examples 7 to 9, a different material from that employed by Examples 1 to 3 was used for forming the inorganic amorphous solid electrolyte film at the interface between the polymer electrolyte and the positive or negative electrode. An inorganic amorphous solid electrolyte film was laid on the positive or negative electrode by sputtering using a mixture of LiI, $Li_2S$ and $B_2S_3$ as the target under the same conditions as in Example 1.

In Example 7, an inorganic amorphous solid electrolyte film of LiI—$Li_2S$—$B_2S_3$ was formed at the respective interfaces between the positive electrode and the polymer electrolyte and between the negative electrode and the polymer electrolyte. Except for this, the same procedure as in Example 1 was taken to fabricate a flat-type polymer electrolyte battery wherein the inorganic amorphous solid electrolyte films 1a, 2a were interposed between the positive electrode 1 and the polymer electrolyte 3 and between the negative electrode 2 and the polymer electrode 2, respectively.

In Example 8, the inorganic amorphous solid electrolyte film of LiI—$Li_2S$—$B_2S_3$ was formed only at the interface between the positive electrode and the polymer electrolyte. A flat-type polymer electrolyte battery was fabricated in a similar manner to Example 2 wherein the inorganic amorphous solid electrolyte film 1a was interposed only between the positive electrode 1 and the polymer electrolyte 3, as shown in FIG. 2.

In Example 9, the inorganic amorphous solid electrolyte film of LiI—$Li_2S$—$B_2S_3$ was formed only at the interface between the negative electrode and the polymer electrolyte. A flat-type polymer electrolyte battery was fabricated in a similar manner to Example 3 wherein the inorganic amorphous solid electrolyte film 2a was interposed only between the negative electrode 2 and the polymer electrolyte 3, as shown in FIG. 3.

Similarly to Examples 1 to 3, the polymer electrolyte batteries of Examples 7 to 9 were each determined for the discharge capacities at cycle 1 and cycle 100. The results are listed in Table 4 as below.

TABLE 4

|  | discharge capacity (mAh) | |
| --- | --- | --- |
|  | at cycle 1 | at cycle 100 |
| example 7 | 3.2 | 3.0 |
| example 8 | 3.1 | 2.9 |
| example 9 | 3.1 | 2.8 |

As apparent from the results, the polymer electrolyte batteries of Examples 7 to 9, wherein at least one of the positive electrode and the negative electrode is formed with the inorganic amorphous solid electrolyte film of LiI—$Li_2S$—$B_2S_3$ at its interface with the polymer electrolyte, have achieved a notable improvement in the charge/discharge cycle characteristics with smaller discharge capacity drops at cycle 100 than the battery of Comparative Example 1 wherein the positive electrode and the negative electrode are free of the inorganic amorphous solid electrolyte film and in direct contact with the polymer electrolyte.

Examples 10 to 12

In Examples 10 to 12, a different material from that employed by Examples 1 to 3 was used for forming the inorganic amorphous solid electrolyte film at the interface between the polymer electrolyte and the positive or negative electrode. An inorganic amorphous solid electrolyte film was laid on the positive or negative electrode by sputtering using a mixture of Li and $\beta Al_2O_3$ as the target under the same conditions as in Example 1.

In Example 10, an inorganic amorphous solid electrolyte film of Li-$\beta Al_2O_3$ was formed at the respective interfaces between the positive electrode and the polymer electrolyte and between the negative electrode and the polymer electrolyte. Except for this, the same procedure as in Example 1 was taken to fabricate a flat-type polymer electrolyte battery wherein the inorganic amorphous solid electrolyte films 1a, 2a were interposed between the positive electrode 1 and the polymer electrolyte 3 and between the negative electrode 2 and the polymer electrode 2, respectively.

In Example 11, the inorganic amorphous solid electrolyte film of Li-$\beta Al_2O_3$ was formed only at the interface between the positive electrode and the polymer electrolyte. A flat-type polymer electrolyte battery was fabricated in a similar manner to Example 2 wherein the inorganic amorphous solid electrolyte film 1a was interposed only between the positive electrode 1 and the polymer electrolyte 3, as shown in FIG. 2.

In Example 12, the inorganic amorphous solid electrolyte film of Li-βAl$_2$O$_3$ was formed only at the interface between the negative electrode and the polymer electrolyte. A flat-type polymer electrolyte battery was fabricated in a similar manner to Example 3 wherein the inorganic amorphous solid electrolyte film 2a was interposed only between the negative electrode 2 and the polymer electrolyte 3, as shown in FIG. 3.

Similarly to Examples 1 to 3, the polymer electrolyte batteries of Examples 10 to 12 were each determined for the discharge capacities at cycle 1 and cycle 100. The results are listed in Table 5 as below.

TABLE 5

| | discharge capacity (mAh) | |
|---|---|---|
| | at cycle 1 | at cycle 100 |
| example 10 | 3.2 | 2.9 |
| example 11 | 3.1 | 2.8 |
| example 12 | 3.1 | 2.7 |

As apparent from the results, the polymer electrolyte batteries of Examples 10 to 12, wherein at least one of the positive electrode and the negative electrode is formed with the inorganic amorphous solid electrolyte film of Li-βAl$_2$O$_3$ at its interface with the polymer electrolyte, have achieved a notable improvement in the charge/discharge cycle characteristics with smaller discharge capacity drops at cycle 100 than the battery of Comparative Example 1 wherein the positive electrode and the negative electrode are free of the inorganic amorphous solid electrolyte film and in direct contact with the polymer electrolyte.

Examples 13 to 15

In Examples 13 to 15, a different material from that employed by Examples 1 to 3 was used for forming the inorganic amorphous solid electrolyte film at the interface between the polymer electrolyte and the positive or negative electrode. An inorganic amorphous solid electrolyte film was laid on the positive or negative electrode by sputtering using a mixture of Li$_2$O, V$_2$O$_3$ and SiO$_2$ as the target under the same conditions as in Example 1.

In Example 13, an inorganic amorphous solid electrolyte film of Li$_2$O—V$_2$O$_3$—SiO$_2$, was formed at the respective interfaces between the positive electrode and the polymer electrolyte and between the negative electrode and the polymer electrolyte. Except for this, the same procedure as in Example 1 was taken to fabricate a flat-type polymer electrolyte battery wherein the inorganic amorphous solid electrolyte films 1a, 2a were interposed between the positive electrode 1 and the polymer electrolyte 3 and between the negative electrode 2 and the polymer electrode 2, respectively.

In Example 14, the inorganic amorphous solid electrolyte film of Li$_2$O—V$_2$O$_3$—SiO$_2$ was formed only at the interface between the positive electrode and the polymer electrolyte. A flat-type polymer electrolyte battery was fabricated in a similar manner to Example 2 wherein the inorganic amorphous solid electrolyte film 1a was interposed only between the positive electrode 1 and the polymer electrolyte 3, as shown in FIG. 2.

In Example 15, the inorganic amorphous solid electrolyte film of Li$_2$O—V$_2$O$_3$—SiO$_2$ was formed only at the interface between the negative electrode and the polymer electrolyte. A flat-type polymer electrolyte battery was fabricated in a similar manner to Example 3 wherein the inorganic amorphous solid electrolyte film 2a was interposed only between the negative electrode 2 and the polymer electrolyte 3, as shown in FIG. 3.

Similarly to Examples 1 to 3, the polymer electrolyte batteries of Examples 13 to 15 were each determined for the discharge capacities at cycle 1 and cycle 100. The results are listed in Table 6 as below.

TABLE 6

| | discharge capacity (mAh) | |
|---|---|---|
| | at cycle 1 | at cycle 100 |
| example 13 | 3.3 | 3.1 |
| example 14 | 3.2 | 2.9 |
| example 15 | 3.2 | 2.9 |

As apparent from the results, the polymer electrolyte batteries of Examples 13 to 15, wherein at least one of the positive electrode and the negative electrode is formed with the inorganic amorphous solid electrolyte film of Li$_2$O—V$_2$O$_3$—SiO$_2$ at its interface with the polymer electrolyte, have achieved a notable improvement in the charge/discharge cycle characteristics with smaller discharge capacity drops at cycle 100 than the battery of Comparative Example 1 wherein the positive electrode and the negative electrode are free of the inorganic amorphous solid electrolyte film and in direct contact with the polymer electrolyte.

Examples 16 to 18 and Comparative Example 2

In Examples 16 to 18 and Comparative Example 2, the positive-electrode material used in the preparation of the positive electrode of Example 1 was replaced by LiMn$_2$O$_4$. There was prepared a mixture containing powdery LiMn$_2$O$_4$, powdery carbon as the electronic conductor and polyvinylidene fluoride as the binder in a weight ratio of 90:6:4. The mixture was added with N-methyl-2-pyrrolidone to form a slurry, which was coated on a positive-electrode current collector of an aluminum foil by means of the doctor blade. Subsequently, the slurry was compressed and heat-treated at 130° C., thus giving a disk-like positive electrode having a thickness of about 100 μm and a diameter of 10 mm.

On the other hand, the negative electrode was prepared the same way as in Example 1.

In Example 16, the same procedure as in Example 1 was taken to form the inorganic amorphous solid electrolyte film of LiTi$_2$(PO$_4$)$_3$ at the respective interfaces between the positive electrode and the polymer electrolyte and between the negative electrode and the polymer electrolyte. As shown in FIG. 1, a flat-type polymer electrolyte battery was fabricated wherein the inorganic amorphous solid electrolyte films 1a, 2a were interposed between the positive electrode 1 and the polymer electrolyte 3 and between the negative electrode 2 and the polymer electrolyte 3, respectively.

In Example 17, the inorganic amorphous solid electrolyte film of LiTi$_2$(PO$_4$)$_3$ was formed only at the interface between the positive electrode and the polymer electrolyte. A flat-type polymer electrolyte battery was fabricated in a similar manner to Example 2 wherein the inorganic amorphous solid electrolyte film 1a was interposed only between the positive electrode 1 and the polymer electrolyte 3, as shown in FIG. 2.

In Example 18, the inorganic amorphous solid electrolyte film of $LiTi_2(PO_4)_3$ was formed only at the interface between the negative electrode and the polymer electrolyte. A flat-type polymer electrolyte battery was fabricated in a similar manner to Example 3 wherein the inorganic amorphous solid electrolyte film 2a was interposed only between the negative electrode 2 and the polymer electrolyte 3, as shown in FIG. 3.

In Comparative Example 2, on the other hand, the inorganic amorphous solid electrolyte film of $LiTi_2(PO_4)_3$ was not laid on the surfaces of the positive electrode and the negative electrode. As shown in FIG. 4, a flat-type polymer electrolyte battery was fabricated wherein the positive electrode 1 and the negative electrode 2 were in direct contact with the polymer electrolyte 3.

Similarly to Examples 1 to 3, the polymer electrolyte batteries of Examples 16 to 18 and Comparative Example 2 were each determined for the discharge capacities at cycle 1 and cycle 100. The results are listed in Table 7 as below.

TABLE 7

|  | discharge capacity (mAh) | |
|---|---|---|
|  | at cycle 1 | at cycle 100 |
| example 16 | 2.9 | 2.7 |
| example 17 | 2.8 | 2.6 |
| example 18 | 2.8 | 2.6 |
| comparative example 2 | 2.5 | 1.2 |

As apparent from the results, the polymer electrolyte batteries of Examples 16 to 18, wherein at least one of the positive electrode and the negative electrode is formed with the inorganic amorphous solid electrolyte film of $LiTi_2(PO_4)_3$ at its interface with the polymer electrolyte, have achieved a notable improvement in the charge/discharge cycle characteristics with a smaller discharge capacity drop at cycle 100 than the battery of Comparative Example 2 wherein the positive electrode and the negative electrode are free of the inorganic amorphous solid electrolyte film and in direct contact with the polymer electrolyte.

Examples 19 to 21

In Examples 19 to 21, the positive electrode was prepared by using the same positive-electrode material of $LiMn_2O_4$ as in Examples 16 to 18. However, a different material from that employed by Examples 16 to 18 was used for forming an inorganic amorphous solid electrolyte film at the interface between the positive or negative electrode and the polymer electrolyte. That is, an inorganic amorphous solid electrolyte film of LiI—$Li_3N$—LiOH was formed by sputtering using a mixture of LiI, $Li_3N$ and LiOH as the target under the same conditions as in Example 1.

In Example 19, the inorganic amorphous solid electrolyte film of LiI—$Li_3N$—LiOH was formed at the respective interfaces between the positive electrode and the polymer electrolyte and between the negative electrode and the polymer electrolyte. As shown in FIG. 1, a flat-type polymer electrolyte battery was fabricated wherein the inorganic amorphous solid electrolyte films 1a, 2a were interposed between the positive electrode 1 and the polymer electrolyte 3 and between the negative electrode 2 and the polymer electrolyte 3, respectively.

In Example 20, the inorganic amorphous solid electrolyte film of LiI—$Li_3N$—LiOH was formed only at the interface between the positive electrode and the polymer electrolyte. A flat-type polymer electrolyte battery was fabricated wherein the inorganic amorphous solid electrolyte film 1a was interposed only between the positive electrode 1 and the polymer electrolyte 3, as shown in FIG. 2.

In Example 21, the inorganic amorphous solid electrolyte film of LiI—$Li_3N$—LiOH was formed only at the interface between the negative electrode and the polymer electrolyte. A flat-type polymer electrolyte battery was fabricated wherein the inorganic amorphous solid electrolyte film 2a was interposed only between the negative electrode 2 and the polymer electrolyte 3, as shown in FIG. 3.

Similarly to Examples 1 to 3, the polymer electrolyte batteries of Examples 19 to 21 were each determined for the discharge capacities at cycle 1 and cycle 100. The results are listed in Table 8 as below.

TABLE 8

|  | discharge capacity (mAh) | |
|---|---|---|
|  | at cycle 1 | at cycle 100 |
| example 19 | 3.0 | 2.8 |
| example 20 | 2.9 | 2.6 |
| example 21 | 2.9 | 2.6 |

As apparent from the results, the polymer electrolyte batteries of Examples 19 to 21, wherein $LiMn_2O_4$ is used as the positive-electrode material and at least one of the positive electrode and the negative electrode is formed with the inorganic amorphous solid electrolyte film of LiI—$Li_3N$—LiOH at its interface with the polymer electrolyte, have achieved a notable improvement in the charge/discharge cycle characteristics with smaller discharge capacity drops at cycle 100 than the battery of Comparative Example 2 wherein the positive electrode and the negative electrode are in direct contact with the polymer electrolyte.

Examples 22 to 24

In Examples 22 to 24, polymer electrolyte batteries were fabricated the same way as in Example 1 except that a different polymer electrolyte was used.

In Example 22, a polymer electrolyte was prepared as follows: A solution was prepared by dissolving polyethylene oxide with a number average molecular weight (Mn) of about 100,000 in acetonitrile. Using the resultant solution, a polyethylene oxide film was formed by casting in a thickness of about 25 μm. The polyethylene oxide film was immersed in a non-aqueous electrolyte solution comprised of a solvent mixture containing ethylene carbonate and diethyl carbonate in a volume ratio of 50:50 and 1 mol/l $LiClO_4$ dissolved therein, thereby giving a gelated polymer electrolyte. Subsequently, the gelated polymer electrolyte was placed on the inorganic amorphous solid electrolyte film of $LiTi_2(PO_4)_3$ over the positive electrode.

In Example 23, a polymer electrolyte was prepared as follows: A solution was prepared by dissolving polyethylene-imine with a number average molecular weight (Mn) of about 200,000 in acetonitrile. Using the resultant solution, a polyethylene-imine film was formed by casting in a thickness of about 25 μm. The polyethylene oxide film was immersed in the non-aqueous electrolyte solution comprised of the solvent mixture containing ethylene carbonate and diethyl carbonate in the volume ratio of 50:50 and 1 mol/l $LiClO_4$ dissolved therein, thereby giving a gelated polymer electrolyte. Subsequently, the gelated polymer electrolyte was placed on the inorganic amorphous solid electrolyte film of $LiTi_2(PO_4)_3$ over the positive electrode.

In Example 24, a polymer electrolyte was prepared as follows: A solution was prepared by dissolving polyvinylidene fluoride with a number average molecular weight (Mn) of about 200,000 in NMP. Using the resultant solution, a polyvinylidenefluoride film was formed by casting in a thickness of about 25 μm. The polyvinylidenefluoride film was immersed in the non-aqueous electrolyte comprised of the solvent mixture containing ethylene carbonate and diethyl carbonate in the volume ratio of 50:50 and 1 mol/l $LiClO_4$ dissolved therein, thereby giving a gelated polymer electrolyte. Subsequently, the gelated polymer electrolyte was placed on the inorganic amorphous solid electrolyte film of $LiTi_2(PO_4)_3$ over the positive electrode.

Except that the polymer electrolytes thus prepared were used, Examples 22 to 24 took the same procedure as in Example 1 to fabricate flat-type polymer electrolyte batteries wherein the inorganic amorphous solid electrolyte films 1a, 2a were respectively interposed between the positive electrode 1 and the polymer electrolyte 3 and between the negative electrode 2 and the polymer electrolyte 3, as shown in FIG. 1.

Similarly to Examples 1 to 3, the polymer electrolyte batteries of Examples 22 to 24 were each determined for the discharge capacities at cycle 1 and cycle 100. The results along with those of Example 1 are listed in Table 9 as below.

TABLE 9

| | type of polymer | discharge capacity (mAh) | |
|---|---|---|---|
| | | at cycle 1 | at cycle 100 |
| example 1 | polyethylene glycol methacrylate | 3.2 | 3.0 |
| example 22 | polyethylene oxide | 3.2 | 3.0 |
| example 23 | polyethylene-imine | 3.1 | 2.8 |
| example 24 | polyvinylidene fluoride | 3.0 | 2.4 |

The results of the polymer electrolyte batteries of Examples 22 to 24 demonstrate that regardless of the various polymers used in the polymer electrolyte, the inorganic amorphous solid electrolyte film of $LiTi_2(PO_4)_3$ formed at the positive electrode/polymer electrolyte interface and the negative electrode/polymer electrolyte interface is effective to reduce the discharge capacity drop at cycle 100. Thus, the batteries of Examples 22 to 24 achieve a notable improvement in the charge/discharge cycle characteristics in contrast to the battery of Comparative Example 1 wherein the positive electrode and the negative electrode are in direct contact with the polymer electrolyte. Particularly in Examples 1, 22 and 23 wherein the polymer of the polymer electrolyte comprises a polyethylene oxide or a polyethylene-imine, such as polyethylene glycol, polyethylene oxide and polyethylene-imine, the discharge capacity drop at cycle 100 is much smaller than that of Example 24 employing a polymer other than the above. That is, the batteries of Examples 1, 22 and 23 accomplish an even greater improvement in the charge/discharge cycle characteristics.

Although the present invention has been fully described by way of examples, it is to be noted that various changes and modifications will be apparent to those skilled in the art. Therefore, unless otherwise such changes and modifications depart from the scope of the present invention, they should be construed as being included therein.

What is claimed is:

1. A polymer electrolyte battery including a positive electrode, a negative electrode and a polymer electrolyte, wherein the positive electrode or the positive electrode and the negative electrode are formed with an inorganic amorphous solid electrolyte film at its interface with said polymer electrolyte.

2. The polymer electrolyte battery as claimed in claim 1, wherein said inorganic solid electrolyte film has a thickness of 10 μm or less.

3. The polymer electrolyte battery as claimed in claim 1, wherein said polymer electrolyte is a gelated polymer electrolyte comprising a polymer impregnated with a non-aqueous electrolyte solution.

4. The polymer electrolyte battery as claimed in claim 1, wherein the polymer of said polymer electrolyte comprises at least one material selected from the group consisting of polyethylene oxides and polyethylene-imines.

5. The polymer electrolyte battery as claimed in claim 3, wherein the polymer of said polymer electrolyte comprises at least one material selected from the group consisting of polyethylene oxides and polyethylene-imines.

6. The polymer electrolyte battery as claimed in claim 1, wherein said inorganic solid electrolyte film contains at least one material selected from the group consisting of $Li_3N$, $LiTi_2(PO_4)_3$, Li-$\beta Al_2O_3$, LiI, LiI—$Li_2S$—$P_2O_5$, LiI—$Li_2S$—$B_2S_3$, LiI—$Li_3N$—LiOH, $Li_2O$—$B_2O_3$, $Li_2O$—$V_2O_3$—$SiO_2$ and $LiTaO_3$.

7. A polymer electrolyte battery including a positive electrode, a negative electrode and a polymer electrolyte, wherein said negative electrode includes a carbon material as a negative-electrode material and has an inorganic amorphous solid electrolyte film formed at its interface with the polymer electrolyte.

8. The polymer electrolyte battery as claimed in claim 7, wherein said inorganic solid electrolyte film has a thickness of 01 μm or less.

9. The polymer electrolyte battery as claimed in claim 7, wherein said polymer electrolyte is a gelated polymer electrolyte comprising a polymer impregnated with a non-aqueous electrolyte solution.

10. The polymer electrolyte battery as claimed in claim 7, wherein a polymer of said polymer electrolyte comprises at least one material selected from the group consisting of polyethylene oxides and polyethylene-imines.

11. The polymer electrolyte battery as claimed in claims 10, wherein the polymer of said polymer electrolyte comprises at least one material selected from the group consisting of polyethylene oxides and polyethylene-imines.

12. The polymer electrolyte battery as claimed in claim 7, wherein said inorganic solid electrolyte film contains at least one material selected from the group consisting of $Li_3N$, $LiTi_2(PO_4)_3$, Li-$\beta Al_2O_3$, LiI, LiI—$Li_2S$—$P_2O_5$, LiI—$Li_2S$—$B_2S_3$, LiI—$Li_3N$—LiOH, $Li_2O$—$B_2O_3$, $Li_2O$—$V_2O_3$—$SiO_2$ and $LiTaO_3$.

* * * * *